US009356702B2

(12) United States Patent
Yu et al.

(10) Patent No.: US 9,356,702 B2
(45) Date of Patent: May 31, 2016

(54) FLATTENED OPTICAL FREQUENCY-LOCKED MULTI-CARRIER GENERATION BY ONE DML AND ONE PHASE MODULATOR

(71) Applicant: ZTE (USA) INC., Austin, TX (US)

(72) Inventors: Jianjun Yu, Princeton, NJ (US); Ze Dong, Morristown, NJ (US)

(73) Assignee: ZTE (USA) Inc., Austin, TX (US)

( * ) Notice: Subject to any disclaimer, the term of this patent is extended or adjusted under 35 U.S.C. 154(b) by 0 days.

(21) Appl. No.: 14/277,884

(22) Filed: May 15, 2014

(65) Prior Publication Data

US 2014/0356002 A1   Dec. 4, 2014

Related U.S. Application Data

(60) Provisional application No. 61/829,301, filed on May 31, 2013.

(51) Int. Cl.
*H04B 10/04* (2006.01)
*H04B 10/50* (2013.01)
(52) U.S. Cl.
CPC ............ *H04B 10/504* (2013.01); *H04B 10/506* (2013.01); *H04B 10/5051* (2013.01)

(58) Field of Classification Search
CPC ........... H04B 10/504; H04B 10/50577; H04B 10/548
See application file for complete search history.

(56) References Cited

U.S. PATENT DOCUMENTS

| | | | |
|---|---|---|---|
| 2006/0210282 A1* | 9/2006 | Iannelli | 398/186 |
| 2009/0110408 A1* | 4/2009 | Dallesasse et al. | 398/185 |
| 2010/0021166 A1* | 1/2010 | Way | 398/79 |
| 2011/0283795 A1* | 11/2011 | Littler et al. | 73/514.26 |
| 2012/0002688 A1* | 1/2012 | Munroe | 372/26 |

* cited by examiner

*Primary Examiner* — Dzung Tran
(74) *Attorney, Agent, or Firm* — Drinker Biddle & Reath LLP

(57) ABSTRACT

The disclosure relates to a method for optical frequency-locked multi-carrier generation based on one directly-modulated laser (DML) and one phase modulator (PM) in cascade driven by sinusoidal waveform (at the same or different frequency). When the DML and PM is driven by the same frequency RF signal at 12.5 GHz, adopting this method, 16 optical subcarriers with 12.5-GHz frequency spacing are generated with power difference less than 3 dB. When the DML and PM is driven by the different frequency with DML at 12.5 Ghz and PM at 25 GHz, over 24 optical subcarriers are generated with 12.5-GHz frequency spacing and amplitude fluctuation less than 3 dB. The number of the generated optical subcarriers can be further increased when the driving power for the DML is increased.

19 Claims, 5 Drawing Sheets

FLATTENED OPTICAL FREQUENCY-LOCKED MULTI-CARRIER GENERATION BY ONE DML AND ONE PHASE MODULATOR

RELATED APPLICATIONS

This Application claims the benefit of U.S. Provisional Application 61/829,301 filed on May 31, 2013, the entirety of which is incorporated herein by reference.

BACKGROUND OF THE INVENTION

The optical coherent and frequency-locked multi-carrier generation is one of the key techniques for the realization of superchannel, which is a promising candidate for future high-speed optical systems and networks. The flattened comb generation based on cascaded intensity modulator (IM) and phase modulator (PM) has been intensively studied and demonstrated. Recently, we have demonstrated flattened comb generation using only phase modulators driven by fundamental frequency sinusoidal sources with small frequency offset. Also, a lot of schemes for flattened comb generation have been demonstrated based on in-phase/quadrate (I/Q) modulator combined with recirculating frequency shifter (RFS). On the other hand, it is well known that relative to IM or PM, directly-modulated laser (DML) has the advantages of compact size, low power consumption and easy integration.

BRIEF SUMMARY OF THE INVENTION

We propose and experimentally demonstrate a novel scheme for optical frequency-locked multi-carrier generation based on one directly-modulated laser (DML) and one phase modulator (PM) in cascade driven by sinusoidal waveform (at the same frequency or different). When the DML and PM is driven by the same frequency RF signal at 12.5 GHz, adopting this scheme, 16 optical subcarriers with 12.5-GHz frequency spacing are successfully generated with power difference less than 3 dB. When the DML and PM is driven by the different frequency with DML at 12.5 Ghz and PM at 25 GHz, we experimentally demonstrate that over 24 optical subcarriers can be generated with 12.5-GHz frequency spacing and amplitude fluctuation less than 3 dB. Furthermore, the number of the generated optical subcarriers can be further increased when we increase the driving power for the DML.

BRIEF DESCRIPTION OF THE DRAWINGS

Having thus described the invention in general terms, reference is now made to the accompanying drawings, which are not necessarily drawn to scale. The accompanying drawings are included to provide a further understanding of the invention, and are incorporated in and constitute a part of this specification. The drawings illustrate disclosed embodiments and/or aspects and, together with the description, serve to explain the principles of the invention, the scope of which is determined by the claims.

Figure 1:
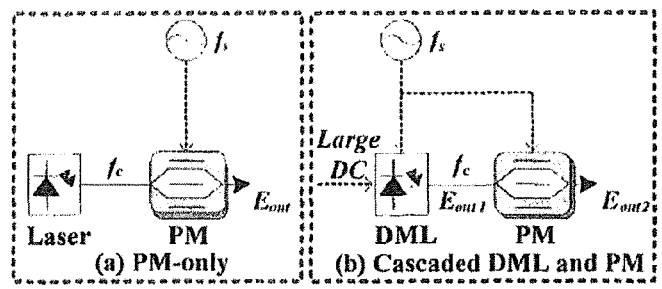

FIG. 1 is a schematic diagram of comb generation based on (a) PM-only and (b) cascaded DML and PM.

Figure 2:
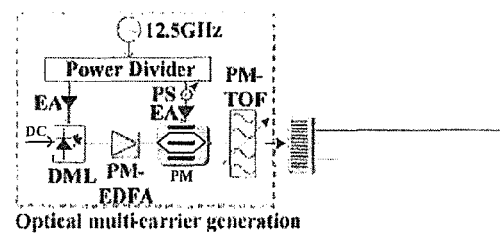

FIG. 2 is an experimental setup for optical multi-carrier generation.

Figure 3:
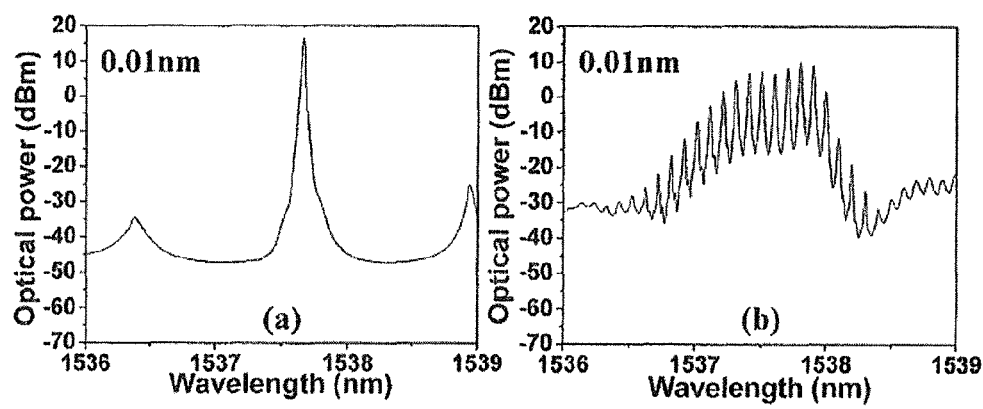

FIG. 3 shows optical spectra (0.01-nm resolution) (a) without and (b) with driving signal.

Figure 4:
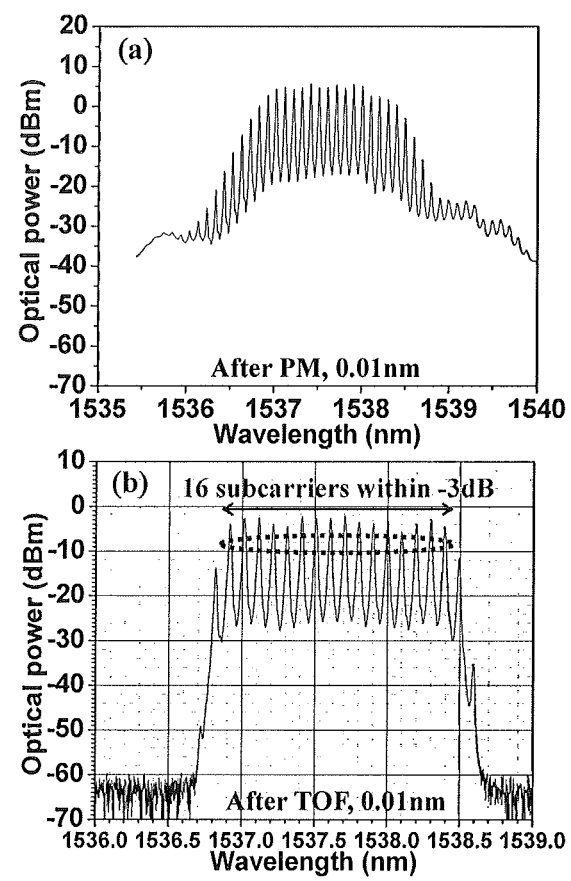

FIG. 4 shows optical spectra (0.01-nm resolution). (a) After PM; (b) after TOF.

Figure 5:
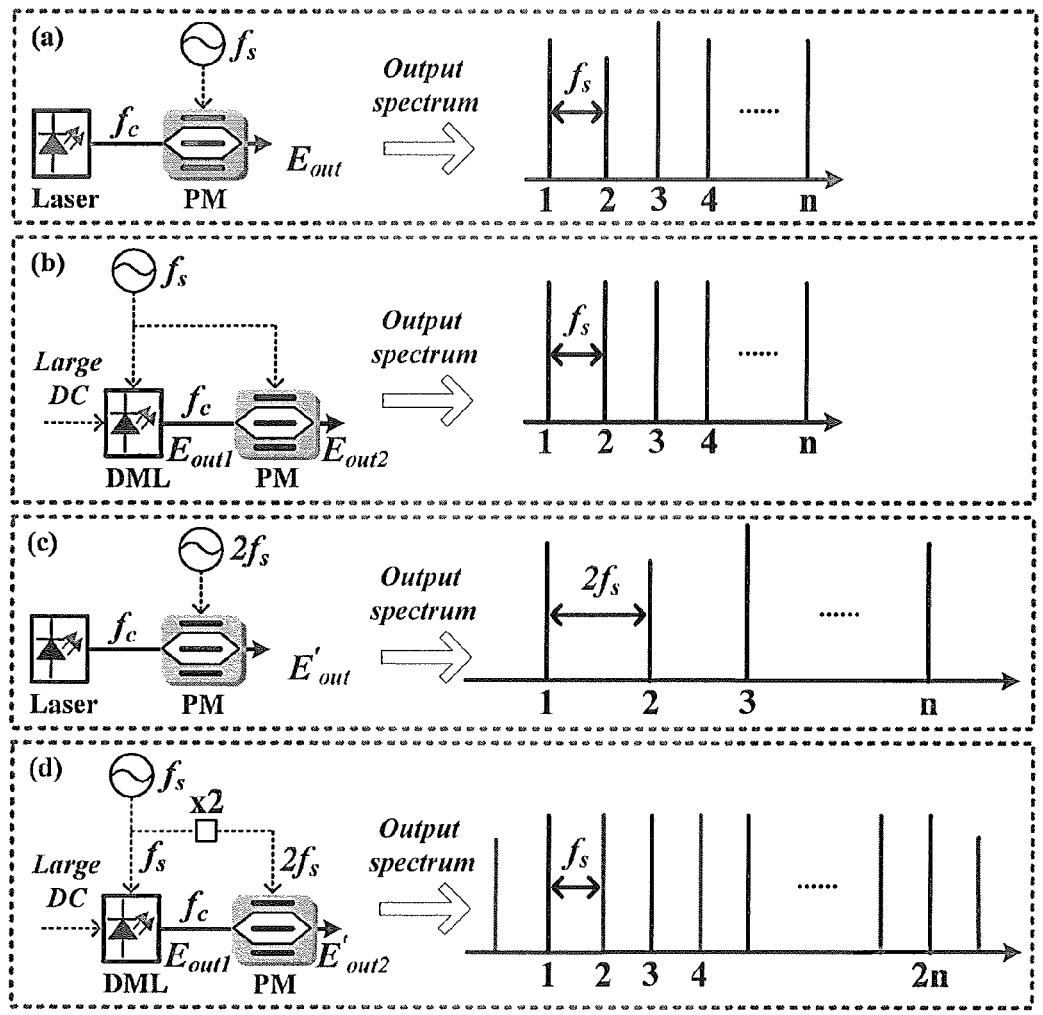

FIG. 5 shows schematic structure and output spectrum of comb generation based on (a) PM-only driven by low-frequency RF clock, (b) cascaded DML and PM driven by the same RF clock, (c) PM-only driven by high-frequency RF clock and (d) cascaded DML and PM driven by different RF clock.

Figure 6:
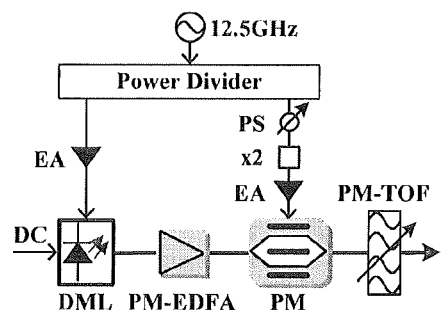

FIG. 6 shows an experimental setup for optical multi-carrier generation based on cascaded DML and PM driven by different RF clock.

Figure 7:
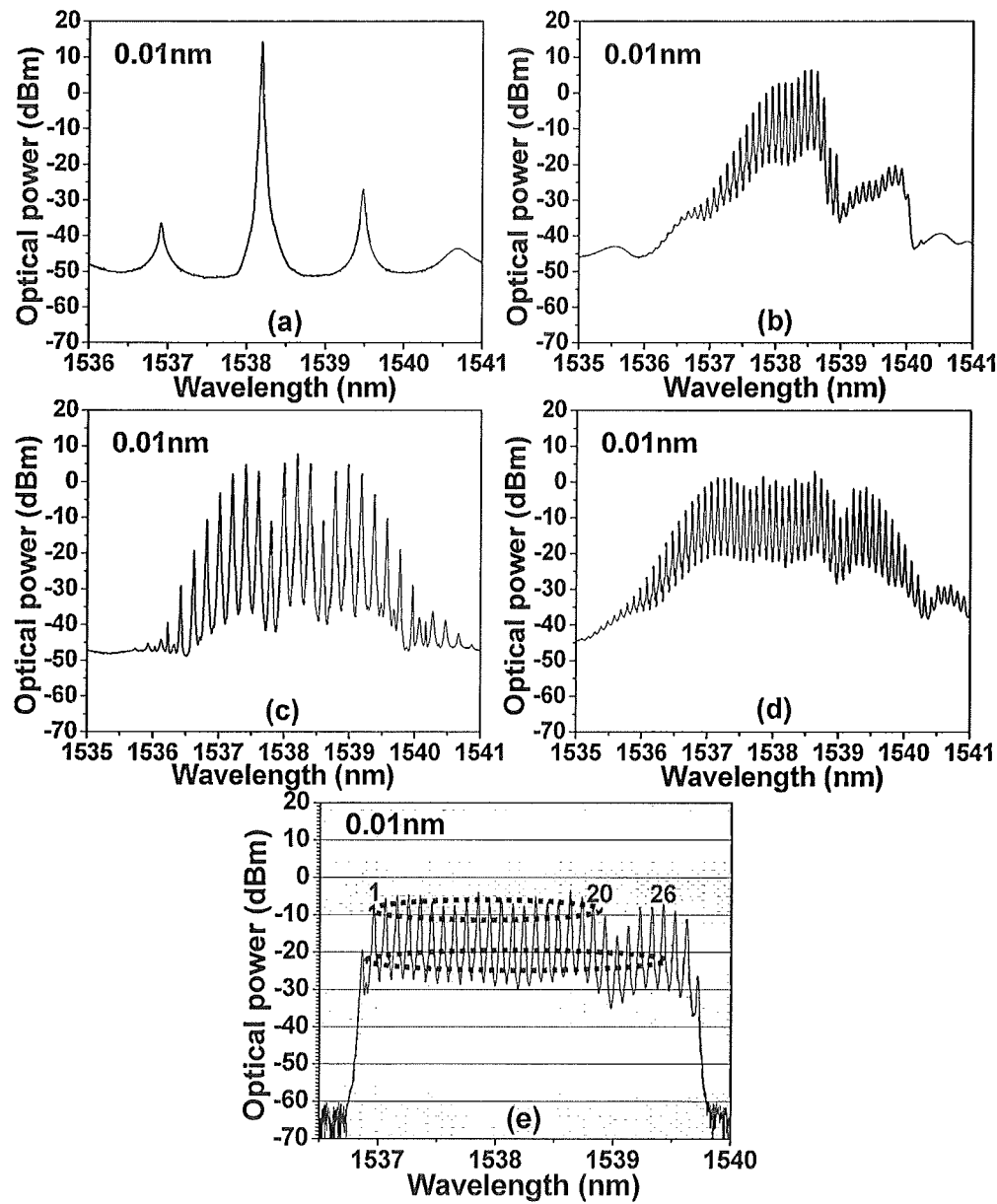

FIG. 7 shows optical spectra (0.01-nm resolution). (a) DML without driving signal; (b) DML with 26-dBm driving signal; (c) DML without driving signal and PM with 30-dBm driving signal; (d) DML with 26-dBm driving signal and PM with 30-dBm driving signal; (e) after PM-TOF when DML with 26-dBm driving signal and PM with 30-dBm driving signal.

Figure 8:
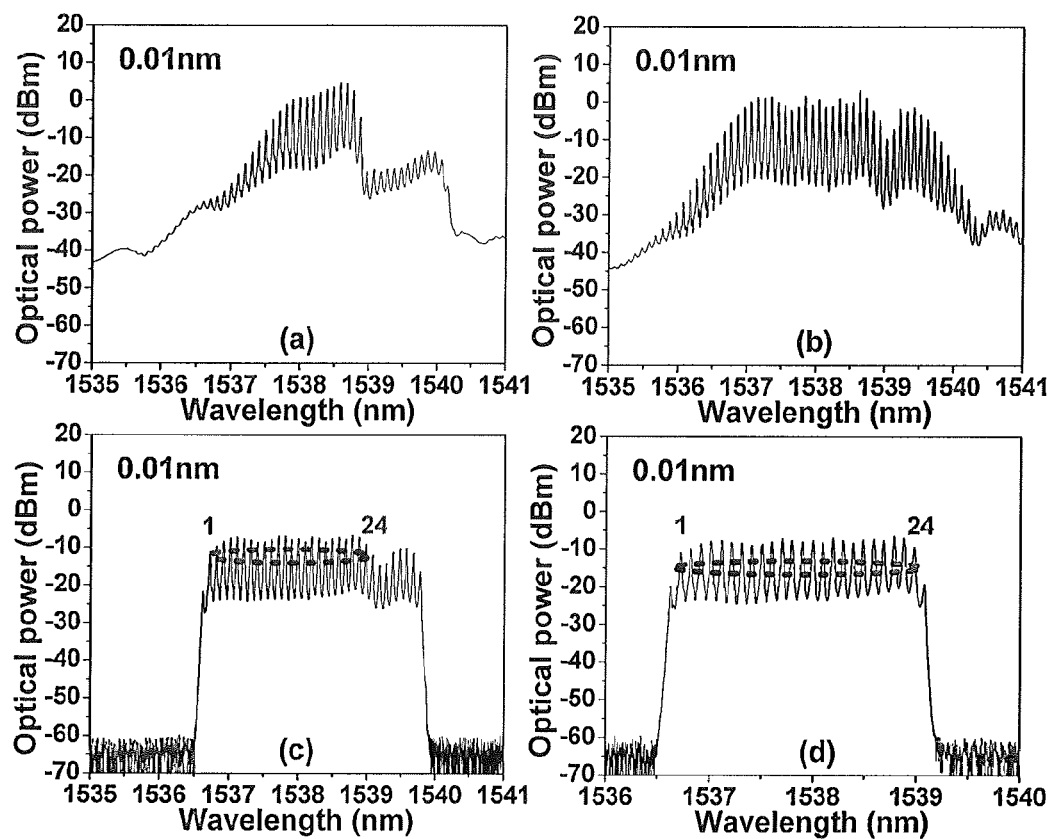

FIG. 8 shows optical spectra (0.01-nm resolution). (a) DML with 29-dBm driving signal; (b) DML with 29-dBm driving signal and PM with 30-dBm driving signal; (c)-(d) after PM-TOF when DML with 29-dBm driving signal and PM with 30-dBm driving signal.

DETAILED DESCRIPTION OF THE INVENTION

Case 1: DML and IM are Driven at the Same Frequency

The present inventions now will be described more fully hereinafter with reference to the accompanying drawings, in which some examples of the embodiments of the inventions are shown. It is to be understood that the figures and descriptions provided herein may have been simplified to illustrate elements that are relevant for a clear understanding of the present invention, while eliminating, for the purpose of clarity, other elements found in typical optical coherent and frequency-locked multi-carrier generation system and methods. Those of ordinary skill in the art may recognize that other elements and/or steps may be desirable and/or necessary to implement the devices, systems, and methods described herein. However, because such elements and steps are well known in the art, and because they do not facilitate a better understanding of the present invention, a discussion of such elements and steps may not be provided herein. The present disclosure is deemed to inherently include all such elements, variations, and modifications to the disclosed elements and methods that would be known to those of ordinary skill in the pertinent art. Indeed, these disclosure inventions may be embodied in many different forms and should not be construed as limited to the embodiments set forth therein; rather, these embodiments are provided by way of example so that this disclosure will satisfy applicable legal requirements. Like numbers refer to like elements throughout.

It is well known that sinusoidal phase modulation of a narrow-band CW laser can create a frequency comb with high repetition rate, tunable frequency spacing and stable optical central frequency. As shown in FIG. 1(a), when one PM driven by a sinusoidal waveform at $f_s$ is used to modulate the CW lightwave at $f_c$, the output electrical field of the PM can be expressed as $$E_{out}(t) = K\ \exp(j2\pi f_c t)\exp[jk\sin(2\pi f_s t)] \quad (1)$$

$$= K\sum_{n=-\infty}^{\infty} J_n(\kappa)\exp[j2\pi(f_c + nf_s)t]$$

Where $J_n$ is the first kind Bessel function of order n, k is the modulation index of the PM, and K is a constant irrelevant to our discussion. The disadvantage for comb generation based on only PM is quite poor spectral flatness. Furthermore, the limited driving voltage of PM and the limitation of electrical amplifiers (EAs) significantly limit the modulation index of PM and the number of the generated optical subcarriers.

In order to overcome the disadvantages of the PM-only scheme, we propose the novel cascaded PM and DML scheme, just as shown in FIG. 1(b). When biased at a large direct current (DC) and driven by a sinusoidal waveform at $f_s$, the output electrical field of a DML at $f_c$ can be expressed as $$E_{out1}(t) \approx K[1+\kappa_1 \sin(2\pi f_s t)]\exp(j2\pi f_c t) \quad (2)$$

Where $k_1$ is the modulation index of the DML. Here, the inherent chirp from the DML is largely removed and can be neglected due to the adoption of the large DC bias. Thus, the output electrical field of the PM driven by the synchronous sinusoidal waveform at $f_s$ can be expressed as $$E_{out2}(t) \approx K[1 + \kappa_1\sin(2\pi f_s t)]\exp(j2\pi f_c t)\exp[j\kappa_2\sin(2\pi f_s t)] = \quad (3)$$

$$K\sum_{n=-\infty}^{\infty} J_n(\kappa_2)\exp[j2\pi(f_c + nf_s)t] -$$

$$jK\frac{\kappa_1}{2}\sum_{n=-\infty}^{\infty} J_n(\kappa_2)\exp\{j2\pi[f_c + (n+1)f_s]t\} +$$

$$jK\frac{\kappa_1}{2}\sum_{n=-\infty}^{\infty} J_n(\kappa_2)\exp\{j2\pi[f_c + (n-1)f_s]t\}$$

Where $k_2$ is the modulation index of the PM. Compared to Eq. (1), the right second and third terms of Eq. (3) can flatten the amplitude of the generated optical subcarriers spaced at $f_s$. Furthermore, the advantages of DML, such as low cost, compact size, low power consumption and so on, make the cost and integration of our proposed scheme much more efficient.

FIG. 2 shows the experimental setup for the flattened optical multi-carrier generation based on our proposed cascaded DML and PM scheme. For optical multi-carrier generation, a 12.5-GHz sinusoidal radio-frequency (RF) signal is first equally halved into two branches by a power divider. Next, one branch is power amplified to 24 dBm and used to drive the DML, while the other is power amplified to 30 dBm and used to drive the PM. The phase shifter (PS) before the PM is used to synchronize the two branches. The DML is a commercially available distributed-feedback (DFB) laser and has 74-mA DC bias and 9.3-dBm average output power. The polarization-maintaining Erbium-doped fiber amplifier (EDFA) between the cascaded DML and PM is used to compensate for the modulation loss. The subsequent polarization-maintaining tunable optical filter (TOF) with tunable bandwidth and wavelength is used to suppress the amplified spontaneous emission (ASE) noise from the polarization-maintaining EDFA. FIGS. 3(a) and (b) show the optical spectra (0.01-nm resolution) after the DML without and with driving signal, respectively. FIGS. 4(a) and (b) show the optical spectra (0.01-nm resolution) after PM and TOF, respectively. 16 optical subcarriers with 12.5-GHz frequency spacing are generated with amplitude fluctuation less than 3 dB.

The cascaded TOF and 12.5/25-GHz optical inter-leaver (IL) is used to choose the desired optical subcarrier from the generated 16 optical subcarriers.

Case II: DML and IM are Driven at the Difference Frequency

As shown in FIG. 5(a), when one PM driven by a sinusoidal RF clock at $f_s$ is used to modulate the CW lightwave at $f_c$, the output electrical field of the PM can be expressed as $$E_{out}(t) = K\ \exp(j2\pi f_c t)\exp[j\kappa\sin(2\pi f_s t)] \quad (4)$$

$$= K\sum_{n=-\infty}^{\infty} J_n(\kappa)\exp[j2\pi(f_c + nf_s)t]$$

Where $J_n$ is the first kind Bessel function of order n, k is the modulation index of the PM, and K is a constant irrelevant to our discussion. The subcarrier spacing is $f_s$. The disadvantage for comb generation based on only PM is quite poor spectral flatness. Furthermore, the limited driving voltage of PM and the limitation of electrical amplifiers (EAs) significantly limit the modulation index of PM and the number of the generated optical subcarriers.

In order to overcome the disadvantages of the PM-only scheme, we propose the novel cascaded PM and DML scheme just as shown in FIG. 5(b). When biased at a large DC and driven by a sinusoidal RF clock at $f_s$, the output electrical field of a DML a $f_c$ can be expressed as $$E_{out1}(t) \approx K[1+\kappa_1 \sin(2\pi f_s t)]\exp(j2\pi f_c t) \quad (5)$$

Where $k_1$ is the modulation index of the DML. Here, the inherent chirp from the DML is largely removed and can be neglected due to the adoption of the large DC bias. Thus, the output electrical field of the subsequent PM driven by the synchronous sinusoidal RF clock at $f_s$ can be expressed as $$E_{out2}(t) \approx K[1 + \kappa_1\sin(2\pi f_s t)]\exp(j2\pi f_c t)\exp[j\kappa_2\sin(2\pi f_s t)] = \quad (6)$$

$$K\sum_{n=-\infty}^{\infty} J_n(\kappa_2)\exp[j2\pi(f_c + nf_s)t] -$$

$$jK\frac{\kappa_1}{2}\sum_{n=-\infty}^{\infty} J_n(\kappa_2)\exp\{j2\pi[f_c + (n+1)f_s]t\} +$$

$$jK\frac{\kappa_1}{2}\sum_{n=-\infty}^{\infty} J_n(\kappa_2)\exp\{j2\pi[f_c + (n-1)f_s]t\}$$

Where $k_2$ is the modulation index of the PM. Compared to Eq. (4), the right second and third terms of Eq. (6) can flatten the amplitude of the generated optical subcarriers spaced at $f_s$. As a result, we can realize flattened optical multi-carrier generation based on the cascaded DML and PM driven by the same RF clock shown in FIG. 5(b).

Also, it is well known that the modulation bandwidth of the DML is relatively narrow, such as about 10 GHz, while that of the PM can be over 40 GHz. Thus, compared to the DML, the PM can be driven by a higher-frequency RF clock. As shown in FIG. 5(c), when one PM driven by a sinusoidal RF clock at $2f_s$ is used to modulate the CW lightwave at $f_c$, the output electrical field of the PM can be expressed as $$E'_{out}(t) = K\ \exp(j2\pi f_c t)\exp[j\kappa\sin(4\pi f_s t)] \quad (7)$$

$$= K\sum_{n=-\infty}^{\infty} J_n(\kappa)\exp[j2\pi(f_c + 2nf_s)t]$$

Similarly, the generated optical subcarriers spaced at $2f_s$ also have quite poor spectral flatness. When we further introduce the DML driven by a RF clock at $f_s$, just as shown in FIG. 5(d), the final output electrical field can be expressed as $$E'_{out2}(t) \approx K[1 + \kappa_1 \sin(2\pi f_s t)]\exp(j2\pi f_c t)\exp[j\kappa_2 \sin(4\pi f_s t)] = \quad (8)$$

$$K \sum_{n=-\infty}^{\infty} J_n(\kappa_2)\exp[j2\pi(f_c + 2nf_s)t] -$$

$$jK\frac{\kappa_1}{2} \sum_{n=-\infty}^{\infty} J_n(\kappa_2)\exp\{j2\pi[f_c + (2n+1)f_s]t\} +$$

$$jK\frac{\kappa_1}{2} \sum_{n=-\infty}^{\infty} J_n(\kappa_2)\exp\{j2\pi[f_c + (2n-1)f_s]t\}$$

The subcarrier spacing is $f_s$. Compared to Eq. (7), the right second and third terms of Eq. (8) can not only flatten the amplitude of the generated optical subcarriers, but also introduce new spectral components and thus double the number of the generated optical subcarriers. That is, if the number of the generated flattened optical subcarriers is theoretically n for the scheme that both the DML and the PM are driven at $f_s$ as shown in FIG. 5(b), the number of the generated flattened optical subcarriers will be 2n for the scheme that the DML is driven at $f_s$ and the PM at $2f_s$ as shown in FIG. 5(d). Moreover, the advantages of DML, such as low cost, compact size, low power consumption and so on, make the cost and integration of our proposed cascaded DML and PM scheme much more efficient.

FIG. 6 shows the experimental setup for the flattened optical multi-carrier generation based on the cascaded DML and PM driven by different RF clock. A 12.5-GHz sinusoidal RF clock is equally halved into two branches by a power divider. One branch first passes through an EA and is power amplified to 24~29 dBm to drive an DML, while the other first passes through a phase shifter (PS), an active frequency doubler (×2) and an EA in serial, and is power amplified to 30 dBm to drive an PM. Here, the PS is used to synchronize the two branches. The DML is a commercially available distributed-feedback (DFB) laser and has a threshold current of 24 mA and modulation bandwidth of over 10 GHz as well as 111-mA DC bias and 10.3-dBm average output power. The PM has 3-V half-wave voltage, 3-dB insertion loss and 32-GHz modulation bandwidth. The polarization-maintaining Erbium-doped fiber amplifier (PM-EDFA) between the cascaded DML and PM is used to compensate for the modulation loss. The subsequent polarization-maintaining tunable optical filter (PM-TOF) with tunable bandwidth and wavelength is used to suppress the amplified spontaneous emission (ASE) noise from the PM-EDFA.

FIG. 7(a) shows the output optical spectrum (0.01-nm resolution) of the DML without driving signal. It can be seen that the side mode suppression ratio (SMSR) of the DML is over 40 dB. FIG. 7(b) shows the output optical spectrum (0.01-nm resolution) of the DML with 26-dBm driving signal. The optical spectrum is asymmetrical at 1538.1-nm central wavelength due to the inherent chirp from the DML [13]. The multi-peak effect at 1539.5 nm is caused by the residual side mode from the DML. The adoption of an optical Fiber Bragg Grating (FBG) filter can remove the side mode and thus improve the performance of the DML. FIG. 7(c) and FIG. 7(d) show the output optical spectra (0.01-nm resolution) of the PM driven at 30 dBm, while for the former the DML has no driving signal and for the latter the DML is driven at 26 dBm. It can be seen that, the generated optical subcarriers based on only phase modulation has quite poor spectral flatness, which can be greatly improved by the introduction of direct intensity modulation. The introduction of direct intensity modulation also halves the subcarrier spacing from 25 GHz to 12.5 GHz and thus doubles the number of the generated optical subcarriers, which agrees well with the previous formulaic analysis. It is worth noting that the lower optical power of the optical subcarriers around 1539.1 nm is related to the inherent chirp and the side mode from the DML. FIG. 7(e) shows the optical spectrum (0.01-nm resolution) after the PM-TOF when the DML is driven at 26 dBm and the PM is driven at 30 dBm. It can be seen that the cascaded DML and PM scheme can generate 20 optical subcarriers with amplitude fluctuation less than 3 dB, or 26 optical subcarriers with amplitude fluctuation less than 5 dB. The neighboring frequency spacing is 12.5 GHz.

When the DML is driven at 29 dBm and the PM is driven at 30 dBm, FIG. 8(a) and FIG. 8(b) respectively show the output optical spectra (0.01-nm resolution) of the DML and the PM, while FIG. 8(c) and FIG. 8(d) after further PM-TOF with different bandwidth. It can be seen that the cascaded DML and PM scheme can generate 24 optical subcarriers with amplitude fluctuation less than 3 dB. The neighboring frequency spacing is 12.5 GHz. Compared FIG. 8 with FIG. 7, we can conclude that the number of the generated optical subcarriers can be further increased when we increase the driving power for the DML.

Although the invention has been described and illustrated in exemplary forms with a certain degree of particularity, it is noted that the description and illustrations have been made by way of example only. Specific terms are used in this application in a generic and descriptive sense only and not for purposes of limitation. Numerous changes in the details of construction and combination and arrangement of parts and steps may be made. Accordingly, such changes are intended to be included in the invention, the scope of which is defined by the claims.

REFERENCES

1. Z. Jiang, C. B. Huang, D. E. Leaird, and A. M. Weiner, "Optical arbitrary waveform processing of more than 100 spectral comb lines," Nat. Photonics 1, 463-467 (2007).
2. J. Yu, Z. Dong, J. Zhang, X. Xiao, H. -C. Chien, and N. Chi, "Generation of coherent and frequency-locked multi-carriers using cascaded phase modulators for 10 TB/s optical transmission system," J. Lightwave Technol. 30(4), 458-465 (2012).
3. Y. Dou, H. Zhang, and M. Yao, "Improvement of flatness of optical frequency comb based on nonlinear effect of intensity modulator," Opt. Lett. 36(14), 2749-2751 (2011).
4. J. Zhang, J. Yu, N. Chi, Z. Dong, X. Li, Y. Shao, J. Yu, and L. Tao, "Flattened comb generation using only phase modulators driven by fundamental frequency sinusoidal sources with small frequency offset," Opt. Lett. 38(4), 552-554 (2013).
5. J. Li, X. Li, X. Zhang, F. Tian, and L. Xi, "Analysis of the stability and optimizing operation of the single-side-band modulator based on re-circulating frequency shifter used for the T-bit/s optical communication transmission," Opt. Express 18(17), 17597-17609 (2010).
6. J. Zhang, J. Yu, N. Chi, Z. Dong, X. Li, Y. Shao, and L. Tao, "Multi-channel optical frequency-locked multi-carrier source generation based on multi-channel recirculation frequency shifter loop," Opt. Lett. 37(23), 4714-4716 (2012).
7. X. Li, J. Yu, Z. Dong, J. Zhang, Y. Shao, and N. Chi, "Multi-channel multi-carrier generation using multi-wavelength frequency shifting recirculating loop," Opt. Express 20(20), 21833-21839 (2012).

8. J. Li and Z. Li, "Frequency-locked multicarrier generator based on a complementary frequency shifter with double recirculating frequency-shifting loops," Opt. Lett. 38(3), 359-361 (2013).

9. F. Tian, X. Zhang, J. Li, and L. Xi, "Generation of 50 stable frequency-locked optical carriers for Tb/s multicarrier optical transmission using a recirculating frequency shifter," J. Lightw. Technol. 29(8), 1085-1091 (2011).

10. J. Yu, Z. Jia, M. F. Huang, M. Haris, P. N. Ji, T. Wang, and G. K. Chang, "Applications of 40-Gb/s chirp-managed laser in access and metro networks," J. Lightwave Technol. 27(3), 253-265 (2009).

The invention claimed is:

1. A system for optical frequency-locked multi-carrier generation comprising:
   one directly-modulated laser (DML), driven by a first sinusoidal signal at a first frequency,
   one phase modulator (PM) in cascade with the DML, driven by a second sinusoidal waveform at a second frequency locked to the first frequency, and arranged to produce a carrier signal having a plurality of sub-carriers, and
   one phase shifter (PS) to synchronize the phases of the driving signals of the DML and the PM.

2. The system of claim 1, wherein the DML and PM are driven by same frequency RF signals.

3. The system of claim 2, wherein at least 16 optical subcarriers within a range of 3 dBm are generated.

4. The system of claim 1, wherein the DML and the PM are driven by different frequency RF signals.

5. The system of claim 4, wherein increasing the driving voltage on the DML increases the number of subcarriers in the system's output having an amplitude within a predetermined range.

6. The system of claim 5, wherein a large DC bias on the DML is used to reduce chirp in its output.

7. The system of claim 4, wherein at least 24 optical subcarriers within a range of 3 dBm are generated.

8. The system of claim 1, wherein the output electrical field of the DML driven by the sinusoidal waveform is characterized by the expression $$E_{out1}(t) \approx K[1 + \kappa_1 \sin(2\pi f_s t)]\exp(j2\pi f_c t)$$

where $k_1$ is the modulation index of the DML, $f_s$ is the frequency of the sinusoidal waveform driving the DML, and $f_c$ is the frequency of the output of the DML, and chirp from the DML is neglected.

9. The system of claim 1, wherein the output electrical field of the PM driven by the locked sinusoidal waveform is characterized by the equation $$E_{out2}(t) \approx K[1 + \kappa_1 \sin(2\pi f_s t)]\exp(j2\pi f_c t)\exp[j\kappa_2 \sin(2\pi f_s t)]$$

$$= K \sum_{n=-\infty}^{\infty} J_n(\kappa_2)\exp[j2\pi(f_c + nf_s)t]$$

$$- jK\frac{\kappa_1}{2} \sum_{n=-\infty}^{\infty} J_n(\kappa_2)\exp\{j2\pi[f_c + (n+1)f_s]t\}$$

$$+ jK\frac{\kappa_1}{2} \sum_{n=-\infty}^{\infty} J_n(\kappa_2)\exp\{j2\pi[f_c + (n-1)f_s]t\}$$

where $J_n$ is the first kind Bessel function of order n, K is a constant, $k_1$ is the modulation index of the DML, $k_2$ is the modulation index of the PM, $f_c$ is the output frequency of the DML, $f_s$ is the subcarrier spacing, and wherein a graph of the right side of the equation contains more peaks within a predetermined range than a graph of the output electrical field of the PM driven by a sinusoidal waveform that is not locked to the first frequency, characterized by the expression $$K \sum_{n=-\infty}^{\infty} J_n(\kappa)\exp[j2\pi(f_c + nf_s)t].$$

10. A method for optical frequency-locked multi-carrier generation in an optical signal transmitter, comprising:
    driving one directly-modulated laser (DML) by a first sinusoidal signal at a first frequency,
    driving one phase modulator (PM) in cascade with the DML by a second sinusoidal waveform at a second frequency locked to the first frequency, and arranged to produce a carrier signal having a plurality of sub-carriers, and
    synchronizing the phases of the driving signals of the DML and the PM by one phase shifter (PS).

11. The method of claim 10, wherein the DML and PM are driven by same frequency RF signals.

12. The method of claim 11, wherein at least 16 optical subcarriers within a range of 3 dBm are generated.

13. The method of claim 10, wherein the DML and PM are driven by different frequency RF signals.

14. The method of claim 13, wherein increasing the driving voltage on the DML increases the number of subcarriers in the optical transmitter output having an amplitude within a predetermined range.

15. The method of claim 14, wherein a DC bias on the DML is used to reduce chirp in its output.

16. The method of claim 13, wherein at least 24 optical subcarriers within a range of 3 dBm are generated.

17. The method of claim 10, wherein the output electrical field of the DML driven by the sinusoidal waveform is characterized by the expression $$E_{out1}(t) \approx K[1 + \kappa_1 \sin(2\pi f_s t)]\exp(j2\pi f_c t)$$

where $k_1$ is the modulation index of the DML, $f_s$ is the frequency of the sinusoidal waveform driving the DML, and $f_c$ is the frequency of the output of the DML, and chirp from the DML is neglected.

18. The method of claim 10, wherein the output electrical field of the PM driven by the locked sinusoidal waveform is characterized by the equation $$E_{out2}(t) \approx K[1 + \kappa_1 \sin(2\pi f_s t)]\exp(j2\pi f_c t)\exp[j\kappa_2 \sin(2\pi f_s t)]$$

$$= K \sum_{n=-\infty}^{\infty} J_n(\kappa_2)\exp[j2\pi(f_c + nf_s)t]$$

$$- jK\frac{\kappa_1}{2} \sum_{n=-\infty}^{\infty} J_n(\kappa_2)\exp\{j2\pi[f_c + (n+1)f_s]t\}$$

$$+ jK\frac{\kappa_1}{2} \sum_{n=-\infty}^{\infty} J_n(\kappa_2)\exp\{j2\pi[f_c + (n-1)f_s]t\}$$

where $J_n$ is the first kind Bessel function of order n, K is a constant, $k_1$ is the modulation index of the DML, $k_2$ is the modulation index of the PM, $f_c$ is the output frequency of the DML, $f_s$ is the subcarrier spacing, and wherein a graph of the right side of the equation contains more peaks within a redetermined range than a graph of the output electrical field of the PM driven b a sinusoidal waveform that is not locked to the first frequency, characterized by the expression $$K \sum_{n=-\infty}^{\infty} J_n(\kappa) \exp[j2\pi(f_c + nf_s)t].$$

19. The method of claim 10, wherein the DML and the PM are driven by different frequency RF signals.

* * * * *